3,621,713
INSTRUMENT FOR MEASURING MASSES AND FORCES

Armin Wirth, Mario Gallo, and Johannes Wirth, Zurich, Switzerland, assignors to Wirth, Gallo & Co., Zurich, Switzerland
Filed Jan. 19, 1970, Ser. No. 3,821
Claims priority, application Switzerland, Feb. 28, 1969, 3,146/69
Int. Cl. G01l 5/22
U.S. Cl. 73—141 A                                10 Claims

ABSTRACT OF THE DISCLOSURE

The invention relates to load-measuring instruments which employ electrical means as the load-measuring means. In the instrument of this invention, the load-measuring means comprises a pair of tensioned strings which are electrically excited to vibrate. A load is applied to said strings so as to vary the tension with a consequent variation in their vibration frequency, which information in turn is transmitted to a digital device which translates it into a load-indicating quantity.

---

This invention relates to instruments for measuring masses and/or forces electrically. More specifically, it relates to instruments comprising a casing or frame which supports two electrically-excited, transversely-vibrating, pretensioned strings to which a load to be measured can be applied so as to vary their tension, the resultant change in the frequency of oscillation being evaluated in a digital evaluating device for the determination and indication of the magnitude of said load.

Instruments of this construction are, in some cases, provided with transmission means for applying a basic tension to the strings and additional transmission means for applying thereto a force which is proportional to the mass or force to be measured through a load-distributing device. The weight of a biasing mass can provide the basic string tension, while evaluating means serve to calculate, for example, the ratio of the frequencies of the two strings. When an object is weighed, i.e. when measuring a mass, this ratio is independent of the acceleration of gravity since the frequency of a string is proportional to the square root of its tension and the latter is a linear combination of the magnitudes of the two weights multiplied by constant factors. Consequently, the ratio of the weight of the unknown mass to that of the known tensioning mass, and hence the ratio of the two masses themselves, can be determined.

However, when measuring a force, the calculated result, i.e. the ratio of the frequencies of the two strings, also depends upon the acceleration of gravity as, although the frequency of each string is proportional to the square root of its tension, the latter is a linear combination subject to constant factors of the measured force (e.g. an elastic force) and of the tensioning weight which varies in proportion to the acceleration of gravity.

In either case, both when measuring a mass or a force, two forces are always distributed by a distributor between the two strings in such a way that the proportional distribution between the two strings of each of the two forces is constant but different for each of the forces.

With regard to the dynamic behaviour of these existing instruments, particularly those in the form of mass-measuring instruments, various solutions have been proposed to offset their behaviour under changing loads and when subject to external vibrations.

First and foremost, the use of a hard sprung measuring system (in relation to the masses that are involved) in combination with a platform suspension which is also hard, leads to a broad band measuring instrument, i.e. to a weighing machine which is capable of providing accurate measurements without much delay within a broad spectrum of low frequency vibrations, because the tensioning mass and the mass that is to be measured can participate in the external vibratory motions within a broad frequency band of low frequency vibrations.

In the case where the platform has a soft suspension and a narrow frequency band width, an arrangement has already been proposed in which the tensioning mass, despite the softly-suspended platform, participates in the movements of the measured mass as rigidly as possible so that measurements can be accurate throughout the weighing range even if the instrument is subject to external vibrations. This proposal is based on the assumption that there is a slight step-down transmission ratio from the weighing platform to the instrument proper so that the mass of the transmitting and ratio-converting system can be regarded as additional to that of the measured object, i.e. a tare weight (which is also dynamically a tare weight). In such a case it is desirable to connect the reference mass by as hard as possible a coupling to the weighing platform whilst suspending the latter as resiliently as possible in relation to the foundations of the instrument.

In this form of instrument, the otherwise valid relationship between the cadence of the balance and its filtration properties with regard to external vibrations ceases to apply, because the balance is capable of correctly measuring a weight that has been newly imposed before the platform has come to rest. However, for major loads and larger transmission ratios between the platform and the measuring element this arrangement has an economic as well as a technical weakness. This is that the entire weighing platform must be suspended to form a so-called "low-pass" filter and this is more expensive to do than to have a low-pass filter at the output-end of the transmission means. The technical weakness (though only applying to high transmission ratios) resides in the difficulty of coupling the transmission means in a simple way rigidly to the weighing platform. On the other hand, the mass of the transmission means causes interference when subjected to vibration if it is not thus connected to the weighing platform. As such, this is not more expensive to arrange than to relate it to the ground, but the resultant instrument is then of a kind in which the entire transmission means, the reference mass and the arrangement of the strings are related to the weighing platform, the latter being connected to the ground by a single low pass filter. Such an arrangement is, to say the least, somewhat unusual and makes high demands upon the construction of the weighing platform.

It is therefore an aim of the present invention to provide an instrument which, whilst retaining as many components as possible of conventional construction, constitutes a definite advance over the instruments used hitherto, and according to the invention an instrument for measuring masses and forces, comprising a frame having a baseplate, at least two damping elements and digital evaluation means mounted on said frame, a load to be measured, two electronically excited, transversely vibrating pretensioned strings each having one end thereof fixed to said frame, a load distributor, the other ends of said strings being connected to said load distributor, means connecting said load to be measured to indirectly tension said strings, said means comprising, first and second transmission elements for transmitting to said load distributor a pre-tensioning force and a force proportional to the load to be measured respectively, one end of each of said transmission elements being fixed to said load distributor so that the distribution of said forces to the two strings is for each force an adjustable ratio, the other ends of said transmission elements being operatively connected to receive their respective forces, and means for applying to the evaluation device resultant frequency variations caused by the application of said loads to said strings for computation and indication of the magnitude of the measured load, each of said first and second transmission elements comprising at least one spring of which one end is connected to the frame via one of said damping elements, so that any alternating forces introduced into said frame from the outside are dissipated in said damping elements and are substantially eliminated from the forces transmitted to said load distributor.

The technical problem which underlies the invention in the case of an instrument for measuring mass therefore resides in transmitting the weight of a comparison mass and a proportion of the dynamically-transferred weight of the mass to be measured to the strings in such a way that the reversing forces generated by the comparison mass and the measured mass in the presence of external vibrations will be proportional to these masses, i.e. to their static weights, particularly throughout the low frequency band in which the two transfer functions are not negligibly small in relation to the static quantities.

In the case of an instrument for measuring forces, the aim of the invention is to transfer the low frequency portions or components of the two forces that are to be applied to the strings, the said low frequency portions being assumed to be the primary values and not subject to interference.

Some examples of measuring instruments in accordance with the invention are schematically shown in the accompanying drawings, in which.

Figure 1:
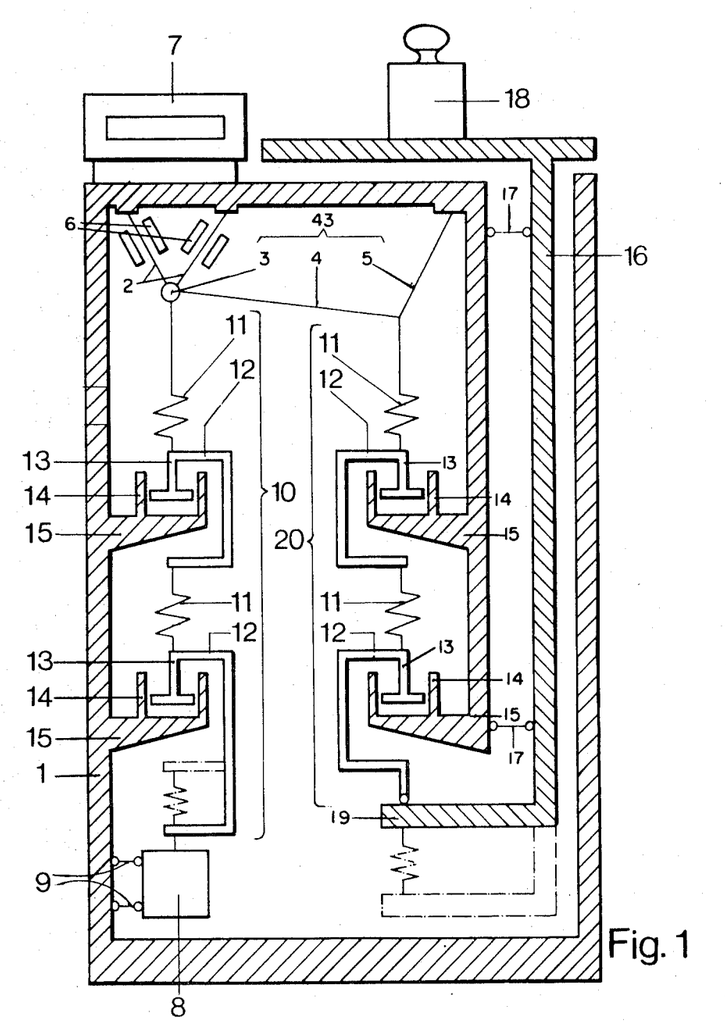
FIG. 1 is a section through one form of instrument.

The instrument illustrated in FIG. 1 is a so-called "table-top" balance comprising a casing 1 to the upper internal surface of which two strings 2 are attached in the form of a V. The lower ends of the strings are fastened to a load distributor 43 comprising a member 3 and two joined-together wires 4 and 5. The strings 2 are arranged to be excited by an electro-magnetic circuit, of which only the magnetic heads 6 are shown, so as to perform transverse vibrations. The electromagnetic circuit also functions to pick up and transmit the frequency and variations in frequency of the said vibrations to digital evaluating device 7 which produces quotients of the two frequencies, or some other non-dimensional function of them, from which the weight of a mass to be measured can be calculated and indicated. The casing 1 also contains a tensioning mass 8 which is guided for limited vertical movement by a parallel linkage 9 and which is connected to the member 3 by transmission means 10. These means comprise two springs 11 and two shackles 12, each shackle 12 being designed to form a piston 13 working in a dashpot 14. The two dashpots 14 are mounted on brackets 15 formed on the inside surface of the casing 1 and are filled with a viscous fluid such as oil. The transmission means 10 here comprise two assemblies 11, 12 each associated with a dashpot 14, but only one assembly or more than two such assemblies could be provided if so desired.

The instrument has a weighing table 16 guided by parallel links 17 for limited vertical motion, the greater part of the table being located inside the casing 1. The flat horizontal top surface of the table carries a mass 18 that is to be weighed, while the lower end 19 of the table is connected by transmission means 20 to the load distributor 43. The transmission means 20 are of analogous construction to the transmission means 10 already described. By suitably adjusting the wire 5, a desired step-up or step-down transmission ratio can be selected for the transmission of a tensioning load representing the weight of the mass 18 to the oscillating strings 2. The distribution ratio of the tensioning load due to the tensioning mass 8 between the two strings 2 remains constant, but it differs from the distribution ratio between the two strings of the load due to the weight of the mass 18. Preferably the load due to the tensioning mass 8 is distributed between the two strings 2 in a 1:1 ratio, while the load transmitted by the transmission means 20 is distributed between the two strings in the ratio of 3:−1.

Figure 2:
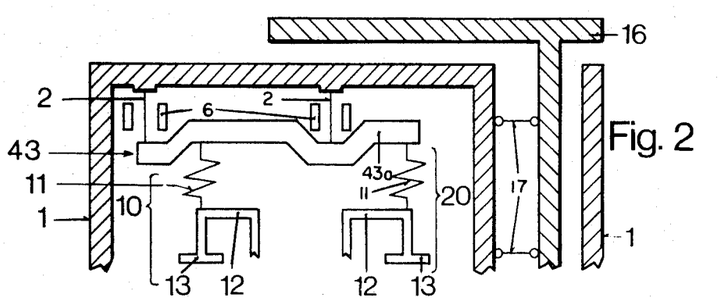
FIG. 2 is a section through a variant of the load distributor shown in FIG. 1.

FIG. 2 illustrates an alternative form of load distributor 43 which includes a distributing lever 43a. However, this alternative and the arrangement illustrated in FIG. 1 (as well as several other designs which will be described later) are all equivalent as regard the manner in which the instrument functions. This will now be described with reference to the measurement of a static load.

When the casing 1 is stationary, the loads due to the tensioning mass 8 and the mass 18 to be measured are transmitted unchanged by the transmitssion means 10 and 20 to the load distributor 43 which divides the loads between the two strings 2. The variation in the frequency of vibration of the strings 2 caused by the load due to the mass 18 is evaluated in a conventional manner by the device 7 and the weight of the mass 18 is thus determined. Whenever the mass 18 is changed, the transmission means 10 and 20 merely have the effect of delaying the corresponding change of the loads acting on the two strings.

If the casing 1 itself is subjected to very low frequency vibrations, the two masses 8 and 18 participate fairly accurately in the motions of the casing 1. Their behaviour may be described as quasi-static. In such a situation, let $z_0$=the maximum amplitude of the vibrations of the casing 1, $\ddot{z}_0$=the corresponding acceleration, $p$=the mass of the tensioning weight 8, and $q$=the mass of the weight 18 that is to be weighed.

The forces required for the reversing acceleration of the two weights will then be $$p\ddot{z}_0 \text{ and } q\ddot{z}_0$$

These forces are transmitted unchanged by the transmission means 10 and 20, i.e. without additional forces being generated by the parallel dashpots 14, to the load distributor 43. Since these two forces bear the same ratio the one to the other as the static loads, they do not interfere with the result of the measurement, because:

(a) Under static conditions $$\frac{q}{p} = \frac{g \cdot q}{g \cdot p}$$

and (b) Under quasi-static conditions $$\frac{q}{p} = \frac{(g + \ddot{z}_0)q}{(g + \ddot{z}_0)p}$$

If, however, the casing 1 is subjected to high frequency vibrations, the tensioning mass 8 and the mass 18 will not be able to participate accurately in the motions of the casing 1. They may therefore be subjected to different accelerating forces. Moreover, some of these accelerating forces will be absorbed in the dashpots 14 so that only residual forces will reach the load distributor 43. If the transfer function $T_p$ of the transmission means 10 and the transfer function $T_q$ of the transmission means 20 are defined as the ratio of the force transmitted to the load distributor 43 in the presence of high frequency vibrations and at an acceleration $\ddot{z}_o$ to the force transmitted under quasi-static conditions at the same acceleration $\ddot{z}_o$, then the result of the measurement will be $$\frac{g \cdot q \left(1 + T_q \frac{\ddot{z}_o}{g}\right)}{g \cdot p \left(1 + T_p \frac{\ddot{z}_o}{g}\right)}$$

Therefore, if the result is to be the required ratio $q/p$, $T_q$ must be equal to $T_p$.

In other words, the transfer functions of the two transmission means 10, 20 must be equal. In practice this can be achieved only approximately because the transfer functions depend upon the masses $p$ and $q$, the mass $q$ being naturally variable. However, if in both transmission means 10 and 20 the dashpots 14 are large in relation to the springs 11, the mass $p$ and the maximum permissible mass $q$, then the transfer functions $T_p$ and $T_q$ can be made to be equal throughout the low frequency band, the transfer functions $T_p$ and $T_q$ differing only in the band of frequencies that are not transmitted by the transmission means. The deviation is therefore insignificant from the point of view of the accuracy of the weighing machine.

In the above argument it has been tacitly assumed that the connection between the mass 18 and the lower shackle 12 of the transmission means 20, i.e. that part adjacent the bottom end of the lower spring 11, is hard and rigid. In reality this connection naturally possesses some resilience. Accordingly, when equating the transfer functions in the low frequency transmittance band, account must be taken of this resilience. Equality of the transfer functions can also be achieved by connecting the respective masses 8 and 18 through springs to the bottom shackles 12 of the transmission means 10 and 20 as shown in dot-dash lines in FIG. 1. This would then compensate the resilience of the suspension of the mass 18. As already mentioned in the introduction, there is a demand in practice for an instrument that will weigh masses on a conventional weighbridge. If such a softly-suspended bridge associated with a major stepdown transmission and sluggish transmission means is used, it is also possible to make the result of the measurement independent of external vibrations. This can be done by selecting the elements 11 and 12 of the transmission means 10 and 20 in such a way that the band width of the transfer functions $T_p$ and $T_q$ is narrow in relation to that of the transfer function of the bridge.

Figure 3:
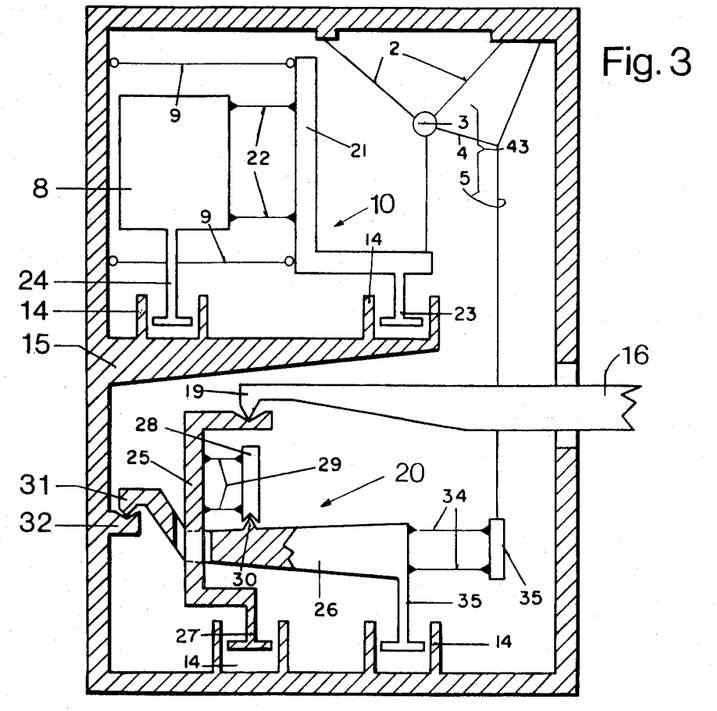
FIG. 3 is a section through a second form of instrument.

FIG. 3 illustrates another form of instrument. Here the tensioning mass 8 is attached to two leaf springs 22 fastened in parallel to one arm of an L-shaped member 21, the springs functioning as parallel links to guide the tensioning mass 8 during vertical movement of the latter and, at the same time, forming resilient suspension members. The L-shaped member 21 has a foot 23 which works in a dashpot 14, while the tensioning mass 8 has a similar foot 24 working in a second dashpot 14. Both dashpots 14 are mounted on a common bracket 15 fixed to an inner wall surface of the casing 1. The transmission means 10 for the tensioning mass 8 thus comprise the elements 14, 21, 22, 23 and 24. In addition, links 9 are indirectly connected to the tensioning mass 8 via the member 21. The bottom end 19 of the weighing platform 16, which is only partly and schematically shown, is connected by transmission means 20 to the wire 5 of the load distributor 43. These transmission means 20 comprise a shackle 25 and a lever 26, the bottom end of the shackle 25 being formed with a foot 27 working in a dashpot 14. A member 28 having a V-rest in its lower surface for a knife edge 30 is connected to the shackle 25 by two parallel leaf springs 29, the knife edge 30 being provided on the lever 26 which has a second knife edge 31 forming a fulcrum in a V-rest in a member 32 extending from an inner wall surface of the casing 1. A foot 33 on the lever 26 works in a second dashpot 14, while the right hand end of the lever 26 carries a small member 35 on two parallel leaf springs 34, the wire 5 being attached to the member 35.

Figure 4:
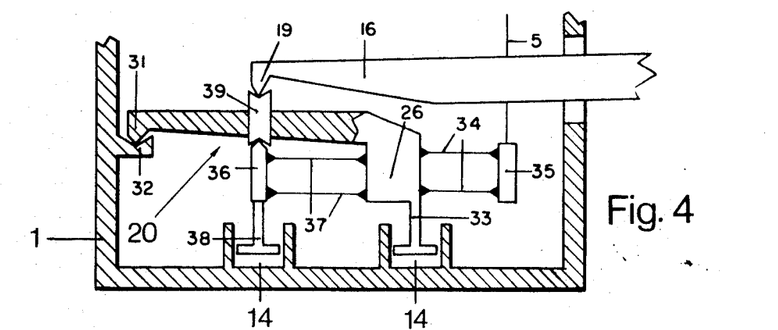
FIG. 4 to 6 are sections through three modified forms of the transmission means shown in FIG. 3 for the quantity to be measured.
Figure 5:
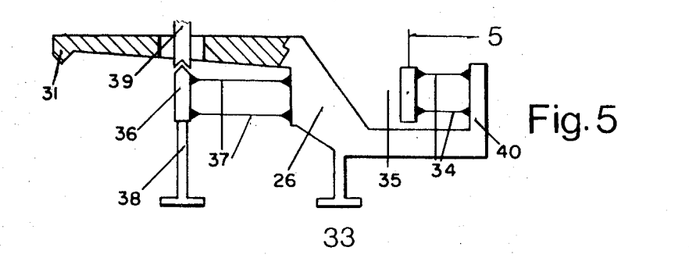
Figure 6:
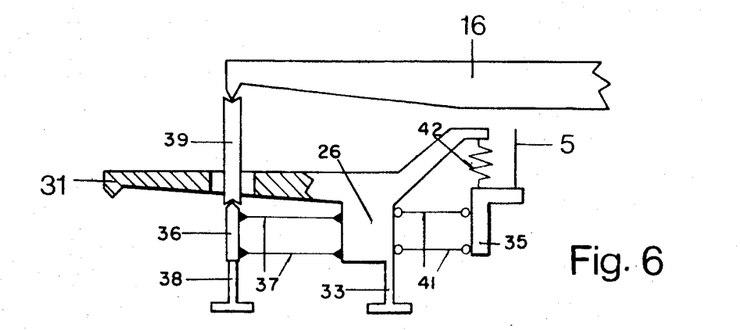

FIGS. 4 to 6 illustrate three variants of the transmission means 20 shown in FIG. 3. In the arrangement according to FIG. 4, the transmission means 20 contain no shackle 25. Instead, a member 36 having a knife edge on its upper surface is attached to the lever 26 by two parallel leaf springs 37, the member 36 having, in addition, a depending foot or extension which works in a dashpot 14. A coupling member 39 having two V-rests, one at its upper end and the other at its lower end, serves to receive the knife edge on the member 36 and a knife edge on the end 19 of the weighing platform 16.

In the arrangement according to FIG. 5, the right hand end of the lever 26 is formed with an L-shaped arm 40, the member 35 being attached by two springs 34 to the left hand side of this arm 40, contrary to the constructions shown in FIG. 3 or FIG. 4. FIG. 6 illustrates a modification of the arrangement shown in FIG. 5, the member 35 here being L-shaped and being guided for limited vertical movement by parallel links 41. Further, the member 35 is coupled to the lever 26 by a spring 42.

Figure 7:
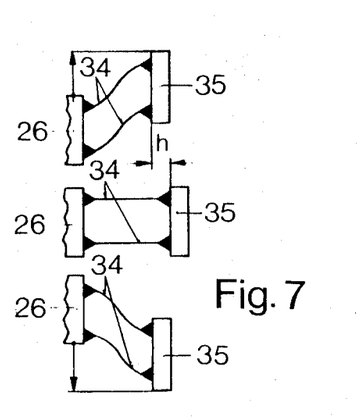
FIGS. 7 and 8 are schematic views showing the manner in which the transmission means illustrated in FIGS. 3–6 function.
Figure 8:
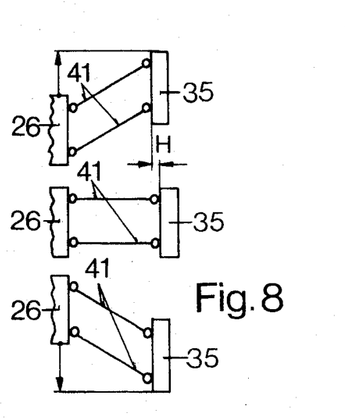

The manner in which the pairs of springs 34 in the constructions of FIGS. 3 to 5 function is schematically shown in FIG. 7, while FIG. 8 shows the manner in which the links 41 in FIG. 6 function. It will be understood from these figures that, in both instances, the effective length of the lever arm 26 which determines the transmission ratio varies in functional dependence on the weighed mass and symmetrically with respect to the centre position by an amount $h$ in FIG. 7 and an amount $H$ in FIG. 8, as the distance of the member 35 from the lever 26 varies. The ends of the leaf springs 34 move about a horizontal centre position, in functional dependence on the load, along the arc of a circle, precisely in the case of FIG. 7, and approximately in the case of FIG. 8. The transmission ratio first varies in one direction and then in the other by an amount which is approximately proportional to the square of the difference between the momentary load and the load in centre position. It is thus possible to correct errors which would otherwise make the instrument less accurate. It will be observed, incidentally, that the arrangement of FIG. 5 operates in the contrary direction to those shown in FIGS. 3 and 4.

Figure 9:
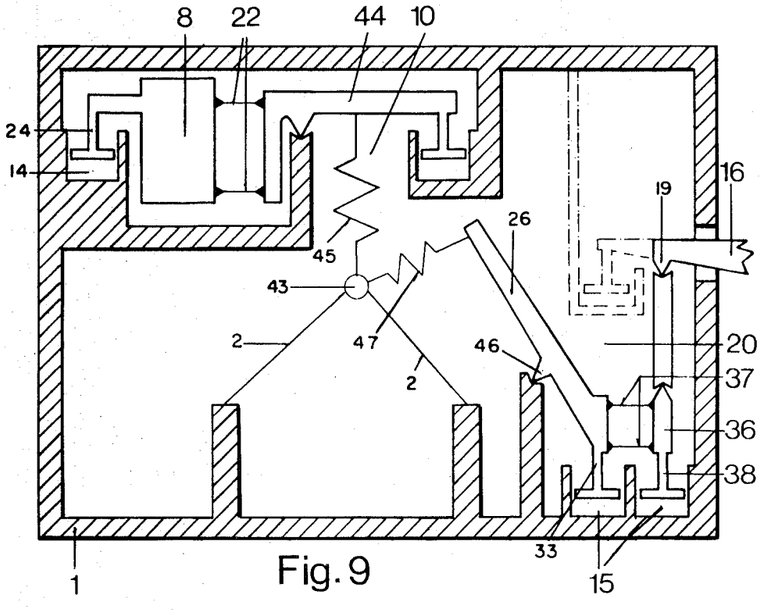
FIG. 9 is a section through a third form of instrument.

FIG. 9 shows another instrument in accordance with the invention. The bottom ends of the strings 2 are attached to the casing 1, while their upper ends are fastened to a load distributor 43. The transmission means 10 comprise a lever 44 which is fulcrumed in the casing 1 by means of a knife edge which rests in a V-groove provided on an arm which extends inwards from a wall surface of the casing 1. This lever 44 is connected by parallel leaf springs 22 to the tensioning mass 8 and by a spring 45 to the load distributor 43. The transmission means 20 comprise a lever 26 resembling the lever shown in FIG. 5, the lever 26 having a knife edge 46 by means of which it fulcrums on an upstanding pillar in the casing 1. A spring 47 connects the end of this lever to the load distributor 43.

Figure 10:
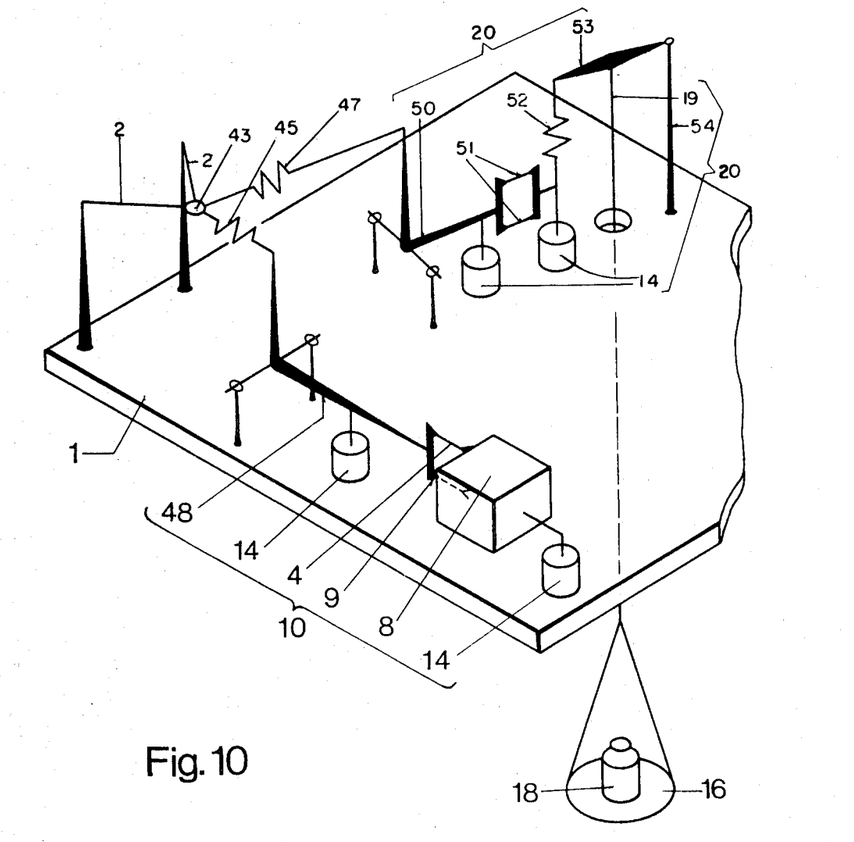
FIG. 10 is a perspective view of a fourth form of instrument.

FIG. 10 is a schematic perspective view of an instrument in which the strings 2 are horizontally disposed. The transmission means 10 comprise a fulcrumed cranked lever 48 which is coupled at one end by a spring 45 to the load distributor 43 and at the other end by parallel leaf springs 49 to the tensioning mass 8. The transmission means 20 comprise a fulcrumed cranked lever 50 coupled by two parallel leaf springs 51 and by a further spring 52 to a lever 53 which is fulcrumed at 54 and which carries the mass 18 to be weighed.

In principle, the explanations already given of the manner in which the instruments shown in FIGS. 1 and 2 function also apply to the arrangements illustrated in FIGS. 3–6 and 9–10. Thus, the manner in which all the said instruments function can be schematically represented by the diagram of FIG. 11a. The load distributor is formed by the combination of the elements 3, 4 and 5, the two transmission means are indicated by boxes 110 and 120, and the lines 55 represent coupling connections to the frame 1. The illustrated system is accordingly an instrument for weighing mass in which the weight of the mass 18 to be determined is found by comparing its weight with that of a tensioning mass. The ratio of these two weights is equal to the ratio of the two masses. The specific arrangements described above permit this equality, which is obvious under stationary conditions, to be preserved when the frame of the machine is exposed to high frequency vibrations of external origin.

The same instrument can also be used for determining the magnitude of a force, for example a reversing force. In FIG. 11b this force F is symbolised by an arrow and is compared, as in FIG. 11a, with the known weight of the tensioning mass 8. The effects of gravitational acceleration, vibrations of the instrument frame and, if present, variations of the force F must be taken into account. The acceleration due to gravity is assumed to be a known constant, and its magnitude must be fed into the evaluating device. If this value varies—for instance at different altitudes above sea level or when the machine is located in an accelerated environment—then the evaluating device must be preadjusted accordingly. In practice this presents no problem. The force components due to vibrations of the machine frame can be reduced to negligible proportions by reducing the band width of the transmission means 10, i.e. by providing a soft suspension of the tensioning mass 8 and/or by using dashpots 14 of large size. As for changes in the components of the force F to be determined, it is assumed that only the low frequency components are of interest and that the high frequency components create interference. The band width of the transmission means 120 is accordingly so chosen that only the former components are transmitted while the latter, high frequency, components are filtered out.

The basic tension of the strings 2 in the arrangements so far described is generated by the weight of a tensioning mass 8. It is, however, possible for a force P (see FIG. 11c) of some other origin, such as the elastic force of a spring, to be used instead. If both transmission means 110 and 120 are each biased by such a force and these forces are transmitted to the strings 2, then the instrument will determine the ratio of these two forces. In other words, it operates as a true dynamometer with neither the acceleration of gravity nor vibrations of the frame playing a significant part. However, as the several elements in the system all have some inertia, it is still advisable to restrict the band width of the transmission means 110. With regard to the reversing part of the foce F indicated in FIG. 11c, this is dealt with as described with reference to FIG. 11b. The result given by the instrument is the ratio of two forces and this is independent of the elastic properties of the element generating the basic tension.

Further, the same force P may be used also to provide the biasing force whilst the transmission means 120 are loaded by the weight of a mass 18 to be weighed. If the frame 1 is steady, the weight of the mass 18 is compared with the reference force P. From this comparison the magnitude of the mass 18 can be derived. However, as applied to a spring balance, the calculation depends not only upon the elastic properties of the element generating the basic biasing tension but also upon the acceleration of gravity. The latter must therefore be taken into account in the evaluating unit. In the presence of vibrations affecting the instrument frame, the transmission means 110 are designed as in FIG. 11b. The transmission 120 is designed to have a band width which should be as narrow as the time factor of the arrangement permits.

Figure 11A:
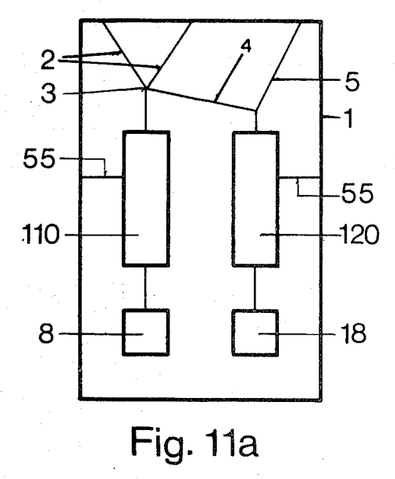
FIG. 11a is a schematic representation of the four instruments shown in FIGS. 1, 3, 9 and 10.
Figure 11B:
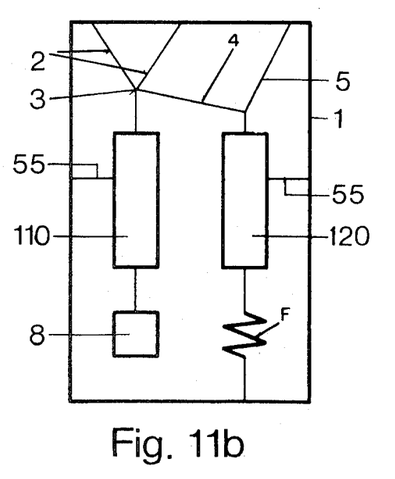
FIGS. 11b and 11c are schematic views illustrating the use of the said instruments for the measurement of forces.
Figure 11C:
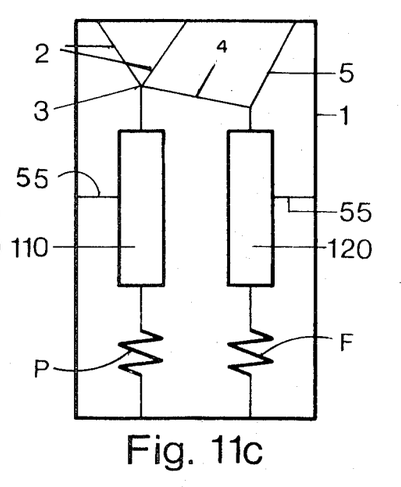
Figure 11D:
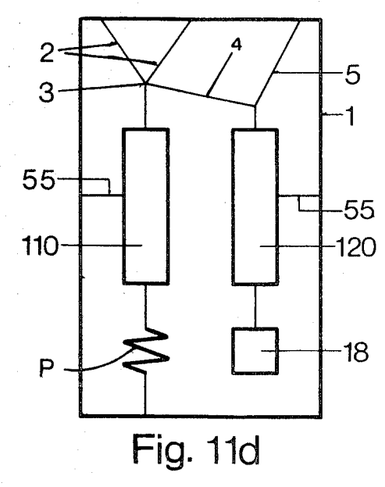
FIG. 11d is a schematic view illustrating the use of the said instruments for the measurement of a mass or an acceleration.

In conclusion, it therefore follows that the constructions illustrated in FIGS. 11a and 11b are inherently mass-weighing machines, while those of FIGS. 11c and 11d are inherently dynamometers. In other words, the instruments according to FIGS. 11a and 11b are for measuring masses, while the instruments according to FIGS. 11c and 11d serve for the measurement of forces. It should also be mentioned that the instrument of FIG. 11d can also be used as an accelerometer by suspending a known mass 18 from the transmission means 120. The result then obtained by the evaluating unit will be proportional to the acceleration $\ddot{z}$ of the casing or frame. The transmission means 110 are also so designed that the forces due to continuous and reversing accelerations of the inertial elements are eliminated as far as is possible. The same applies to the transmission means 120 as regards the high frequency components—which are assumed to be undesirable—of the acceleration to be measured.

We claim:

1. An instrument for measuring loads, comprising a frame having a baseplate, at least two damping elements and digital evaluation means mounted on said frame, two electronically excited, transversely vibrating pre-tensioned strings each having one end thereof fixed to said frame, a load distributor, the other ends of said strings being connected to said load distributor, means connecting the load to be measured to indirectly tension said strings, said means comprising, first and second transmission elements for transmitting to said load distributor a pre-tensioning force and a force proportional to the load to be measured respectively, one end of each of said transmission elements being fixed to said load distributor so that the distribution of said forces to the two strings is for each force in an adjustable ratio, the other ends of said tansmission elements being operatively connected to receive their respective forces, and means for applying to the evaluation means resultant frequency variations caused by the application of said forces to said strings for computation and indication of the magnitude of the measured load, each of said first and second transmission elements comprising at least one spring of which one end is connected to the frame via one of said damping elements, so that any alternating forces introduced into said frame from the outside are dissipated in said damping elements, and are substantially eliminated from the forces transmitted to said load distributor.

2. An instrument according to claim 1, further comprising a mass inside said frame, said mass generating said pretensioning force and being connected to said first transmission elements.

3. An instrument according to claim 2, further comprising means for guiding said mass for limited and parallel movement, said mass guiding means comprising links attached on one end to said mass and on the other end to said frame.

4. An instrument according to claim 2, further comprising a solid body mounted within said first transmission elements, means for guiding said mass for limited and parallel movement, said mass guiding means comprising two leaf springs attached on one end to said body and on the other end to said mass, means for guiding said body comprising links attached on one end to said body and on the other end to said frame.

5. An instrument according to claim 2, further comprising in said first transmission elements for transmitting to said load distributor said pre-tensioning force a lever fulcrumed on said frame connected to said load distributor by a spring, means for connecting said mass to said first transmission elements comprising two parallel leaf springs fixed on one end to said mass and on the other end to said lever.

6. An instrument according to claim 2, further comprising in each of said first and second transmission elements a cranked lever.

7. An instrument according to claim 1, further comprising a lever fulcrumed in said frame and mounted within said second transmission elements.

8. An instrument according to claim 7, further comprising a member connected to said load distributor, means for guiding said member for limited movement comprising two parallel leaf springs attached on one end to said member and on the other end to said lever.

9. An instrument according to claim 7, further comprising a member connected to said load distributor, means for guiding said member for limited movement comprising two parallel links attached on one side to said lever and on the other side to said member, means for operationally connecting said member and said lever comprising a spring mounted between said member and said lever.

10. An instrument according to claim 7, further comprising another member connected to said load to be measured, means for guiding said other member comprising two leaf springs attached one end to said other member and on the other end to said lever.

References Cited

UNITED STATES PATENTS 3,423,999   1/1969   Wirth et al. _________ 73—141

FOREIGN PATENTS 459,603   9/1968   Switzerland.

CHARLES A. RUEHL, Primary Examiner

U.S. Cl. X.R.

177—210